Dec. 20, 1955  H. C. JOHNSON ET AL  2,727,753
ADJUSTABLE LAWN MOWER HANDLE

Filed Dec. 8, 1952  3 Sheets-Sheet 1

INVENTORS
HERBERT C. JOHNSON
DONALD L. WICKS
PAUL L. NERDAHL
BY Paul, Moore & Rugger
ATTORNEYS Dec. 20, 1955  H. C. JOHNSON ET AL  2,727,753
ADJUSTABLE LAWN MOWER HANDLE
Filed Dec. 8, 1952  3 Sheets-Sheet 2

INVENTORS
HERBERT C. JOHNSON
DONALD L. WICKS
PAUL L. NERDAHL
BY Paul, Moore & Dugger
ATTORNEYS Dec. 20, 1955  H. C. JOHNSON ET AL  2,727,753
ADJUSTABLE LAWN MOWER HANDLE
Filed Dec. 8, 1952  3 Sheets-Sheet 3
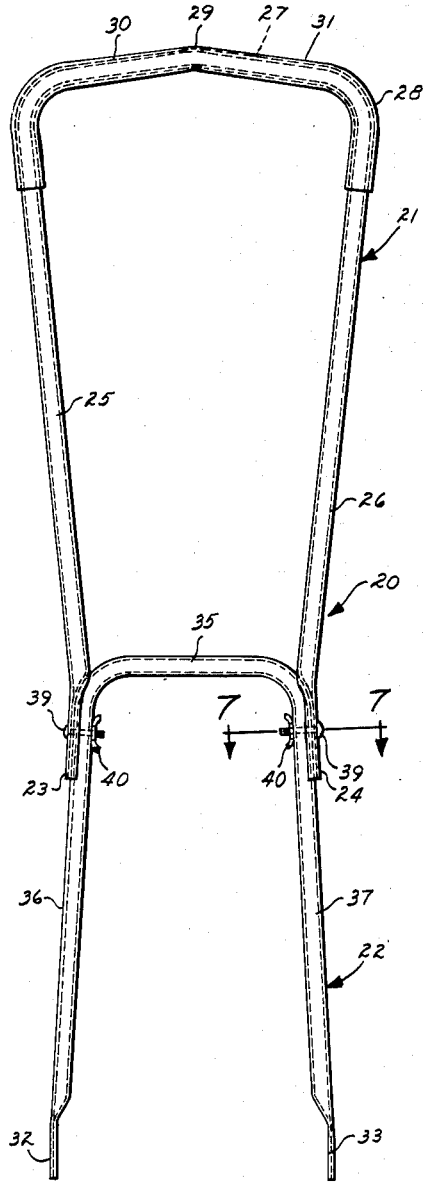
FIG. 3
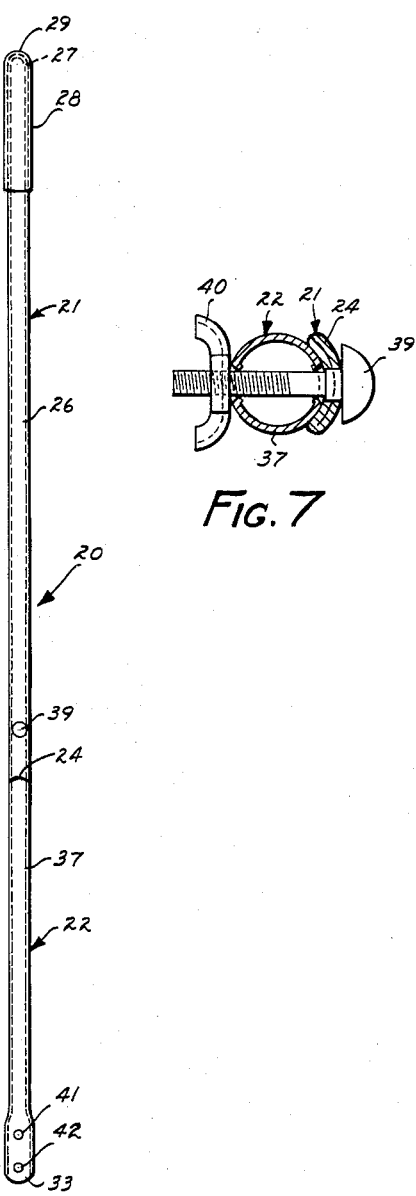
FIG. 4
FIG. 7
INVENTORS
HERBERT C. JOHNSON
DONALD L. WICKS
PAUL L. NERDAHL
BY
ATTORNEYS

United States Patent Office 2,727,753
Patented Dec. 20, 1955

2,727,753

ADJUSTABLE LAWN MOWER HANDLE

Herbert C. Johnson, Donald L. Wicks, and Paul L. Nerdahl, Minneapolis, Minn., assignors to Foley Manufacturing Company, Minneapolis, Minn., a corporation of Minnesota Application December 8, 1952, Serial No. 324,734

8 Claims. (Cl. 280—47.37)

This invention relates to new and useful improvements in handles and particularly in folding handles for lawn mowers.

One of the objects of this invention is to provide a new and useful lawn mower handle having a floating pivot for vertical adjustment of the handle between the adjustable limits for response to the incline of the surface being mowed;

Still another object of this invention is to provide a lawn mower handle having a release means whereby the handle may be swung downwardly over the top of the lawn mower and folded for storage;

Still another object of this invention is to provide a lawn mower having independent means for adjusting the angle at which the handle extends from the mower to suit the physical requirements of the individual operator;

Still another object of this invention is to provide a loop-type lawn mower handle having means for providing limited vertical movement of the handle when in operating position and with release means for moving the handle from operating to inoperative position;

Other and further objects of this invention are those inherent and apparent in the apparatus as described, pictured and claimed.

This invention will be described with reference to the drawings in which corresponding numerals refer to corresponding parts and in which:

Figure 3 is a front view of the handle of the instant invention;

Figure 4 is a side elevation of the handle of Figure 3;

Figure 7 is a view taken along the line and in the direction of the arrow 7—7 of Figure 3.

Figure 1:
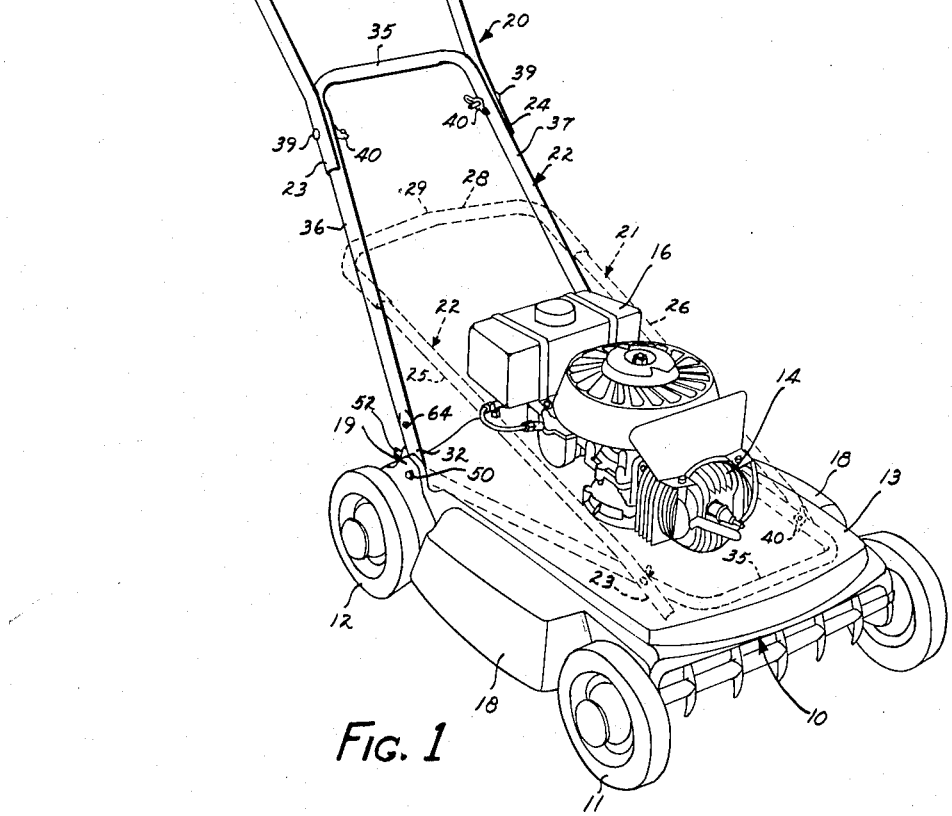
Figure 1 is an isometric view of a power lawn mower showing the handle of the instant invention in operating position and showing in dotted lines, the handle folded to out-of-the-way or storage position.

Referring now to the drawings and specifically to Figure 1, there is shown a power driven lawn mower, generally designated 10, provided with two pair of wheels 11 and 12, wheels 11 being positioned at the front of a housing 13 and the wheels 12 being positioned at the rear of housing 13. Housing 13 is supported upon the axles for wheels 11 and 12 in any conventional manner, not shown. Housing 13 in turn supports a motor generally designated 14 and a fuel tank 16. The motor 14, and tank 16 are positioned in the center of housing 13 as is shown best with reference to Figure 1.

The housing 13 is generally rectangular in character and has a pair of extending fenders 18 positioned between cooperating wheels 11 and 12. Positioned on each of the rear corners of the housing 13 and adjacent the wheels 12 are lugs 19. The lugs 19 are of the configuration best shown in Figure 6. However, it is to be understood that they may be of any suitable configuration, as desired.

The handle, as best shown in Figures 3 and 4 comprises a handle top 21 and a handle bottom 22. Top 21 is roughly U-shaped with the ends 23 and 24 of the U being drawn closer together so that the side members 25 and 26 converge from the widest point at which they contact the stem 27 of the U. Positioned over the stem 27 of the U as shown best in Figure 3 is a handle grip 28 which extends along the side members 25 and 26 a slight distance as shown in that figure. The handle grip 28 may be of rubber, plastic or any other desired material.

The stem 27 is of the configuration shown in Figure 3 and thus (from the point of view of the operator of the mower, who has grasped the handle) is provided with a central projection 29 from which declines portions 30 and 31. The decline of portions 30 and 31 insures that the arms of the operator will be substantially perpendicular thereto, inasmuch as the arms of the operator will converge inwardly from the shoulder substantially similar to the convergence of side members 25 and 26.

The terminal ends 23 and 24 of the handle are flattened and inwardly concave as is shown for end 24 in Figure 7. Positioned in each of terminal ends 23 and 24 is an aperture adapted to receive the head of a bolt 39, having a wing-nut 40. The inner concave surface of ends 23 and 24 cooperates with the arcuate convex surface of handle bottom 22 as will be apparent by reference to Figures 3, 4 and 7.

The handle bottom 22 comprises a substantially U-shaped member with a base 35 and arms 36 and 37. As is noted with reference to Figure 3, arms 36 and 37 are substantially parallel but slightly diverging from base 35. The ends 32 and 33 of arms 36 and 37 respectively are flattened and each is provided with apertures 41 and 42 as is shown for end 33 in Figure 4.

Referring now specifically to Figure 7, it will be seen that the concave inner surface of end 24 cooperates with the convex outer surface of arm 37 of handle bottom 22 and that bolt 39, together with wing-nut 40, may be tightened to maintain arms 26 and 37 in their relative position as shown in Figure 7 or that wing-nut 40 may be loosened so that the arms may be swung from the full line position to the dotted line position of Figure 1. The function and cooperation of arms 25 and 26 is identical therewith and will not be explained separately.

Figure 6:
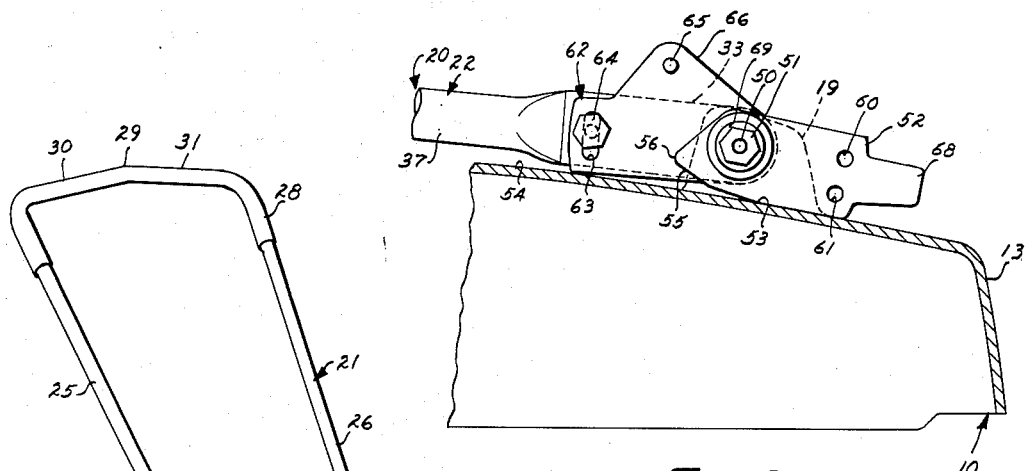
Figure 6 is a view similar to Figure 5 but showing the handle in folded or storage position.
Figure 5:
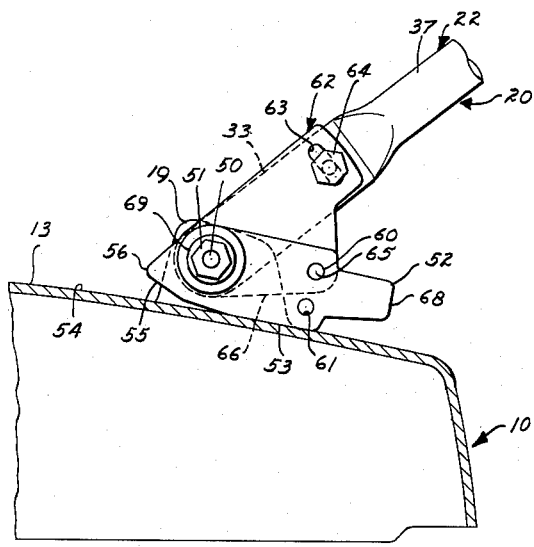
Figure 5 is an enlarged fragmentary view of the adjustable means for attaching the handle to the mower, the handle being positioned in operating position.

Referring now specifically to Figures 5 and 6, a bolt 50 and nut 51 is provided and extends through the aperture in each lug 19. The lugs are identical, as are the connections thereto. Consequently, only the connection of member 37 to one of lugs 19 will be explained but it is to be understood that this likewise refers to the other lug 19 and member 36.

The bolt 50 and nut 51 likewise extends through the aperture 42 of handle member 33 and through an aperture in handle stop plate 52. Handle stop plate 52 is of the configuration shown best in Figure 5 and is provided with a lower terminal edge 53 which rests on the surface 54 of housing 13. Plate 52 is also provided with an inclined surface 55 at the forward end thereof which prevents motion of the plate in a counterclockwise direction with reference to Figure 5 beyond the point at which the tip 56 engages surface 54 of housing 13. Otherwise the plate 52 is free to rotate about the shank of bolt 50 and thus limited rotation is provided.

Disposed in plate 52 is a pair of apertures 60 and 61. As is shown best with reference to Figure 5, aperture 60 is positioned above aperture 61. The handle adjusting plate generally designated 62 is provided with an aperture not shown through which is likewise passed the shank of the bolt 50. At the upper end of plate 62 is a slightly arcuate, elongated aperture 63 through which passes the shank of bolt 64 which also passes through a hole 41 in the handle leg 36 and is secured thereto by a nut. A stud 65 is provided on the depending triangular portion 66 thereof and the stud 65 is adapted to be positioned in either of apertures 60 or 61. In Figure 5, it is shown positioned in aperture 60. However, if it is desired the stud 65 may be positioned in aperture 61 and thus the handle 20 will be at a lesser angle of incline with reference to the surface 54 of housing 5. Likewise, the stud 65 may be removed from either of the apertures 60 and 61 and the handle 20 swung to the position of Figures 6 and 2. This is the folded or out-of-the-way position when the machine is not in use.

Each of the handle adjusting plates 62, being provided with elongated aperture 63, may be moved relative to members 36 and 37 when bolt 65 is loosened and thus limited adjustment of the members 36 and 37 to vary the angle of incline with reference to surface 54 is provided without moving the stud 65 from either of the apertures 60 or 61.

Each handle stop plate 52 is provided with an extending thumb piece 68 which may be moved (toward the viewer with reference to the plate 62 of Figure 5) to disengage the stud 65 from aperture 60 and thus allow the movement of the handle 20 from the position of Figure 5 to the position of Figure 6. Disposed on the shank of bolt 50 is a spring washer 69 which bears against stop plate 52 as is best shown with reference to Figure 5 and this spring washer 69 allows this movement of the thumb piece 68 forward with reference to the viewer in Figure 5.

Figure 2:
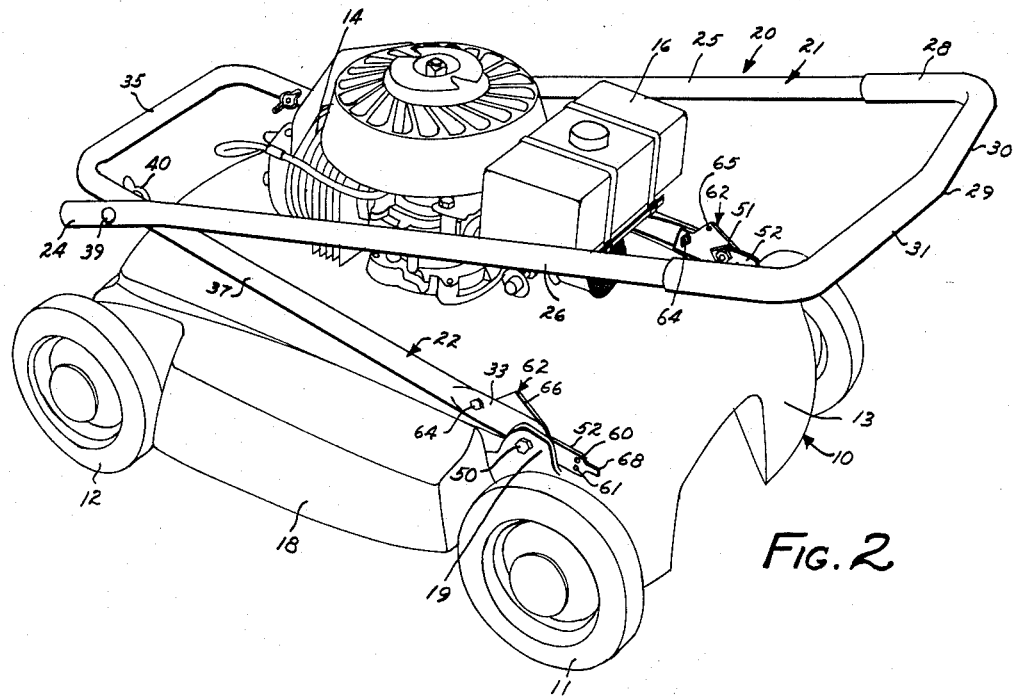
Figure 2 is an isometric view of the mower of Figure 1 showing the handle in folded or storage position.

Thus, it may be seen that the handle 20 may be folded from the full line position of Figure 1 to the position of Figure 2 by releasing the wing-nuts 40 and folding the top 21 over the bottom 22 as shown in Figure 2. In order to bring the members 36 and 37 of bottom 22 from the position as shown for member 37 in Figure 5 to the position shown in Figure 2, the thumb pieces 68 of members 52 are brought inwardly until studs 65 clear apertures 60 so the bottom portion 22 of the handle may then be swung to the position of Figure 2. The handle adjusting plates 62 being connected to members 36 and 37 are thus swung to the position of Figure 2 along with these members.

If during the operation of the mowing machine 10 the angle of incline of the surface being cut changes the stud 65 may be moved from the position shown in Figure 5 into aperture 61 and thus an angle of lesser incline between the housing surface 54 and the handle members 36 and 37 is provided. If operators of different physical characteristics (height or length of arms) are to use the mower, the handle may be adjusted to suit the individual operator by loosening the nuts of bolts 64 so that the members 36 and 37 may be moved relative to the handle adjusting plates 62 whereupon nuts of bolts 64 are once again tightened.

As many apparently widely differing embodiments of this invention may be made without departing from the spirit and scope thereof, it is to be specifically understood that we do not limit ourselves to the particular embodiment disclosed herein.

What we claim is:

1. A handle mechanism for a wheeled vehicle comprising in combination a pair of extending lugs extending from the upper surface of said vehicle and positioned adjacent the rear edge thereof, a pair of first extending members each pivotally attached at one end to one of said extending lugs, a pair of second members each pivotally attached to one of said extending lugs and having a portion cooperating with the upper surface of said vehicle whereby said second members are positioned for limited pivotal movement only, and releasable means attaching each one of said second members to one of each of its respective extending members.

2. The apparatus of claim 1 further characterized by said releasable means comprising a pair of third members each pivotally attached to one of said lugs, said third members each having means for adjustably positioning it with reference to its respective first member and means for releasably but immovably positioning it in a plurality of predetermined positions with reference to its respective second member.

3. A handle mechanism for a wheeled vehicle comprising in combination a pair of lugs extending from said vehicle, a pair of first extending members each pivotally attached by a pivot at one end to one of said extending lugs, a second pair of members, each member of said latter pair being pivoted about one of said pivots and positioned for limited pivotal movement with respect thereto, and releasable means attaching each of said second members to a respective extending member.

4. The structure of claim 3 in which said second pair of members comprise stop members and said releasable means comprises a pair of adjustment members, each of said adjustment members being pivoted about one of said pivots and having means whereby it may be adjustably but immovably positioned with reference to its respective extending member.

5. The structure of claim 4 in which each of said stop members may be moved axially to its respective adjustment member whereby said adjustment member and its respective extending member may be moved as a unit pivotally with respect to its respective stop member.

6. The structure of claim 5 together with spring means for biasing each said stop member axially with reference toward its respective adjustment member.

7. In a handle mechanism for use with a wheeled vehicle having a lug extending from the vehicle housing surface, the improvement comprising an extending handle member pivotally attached to said lug, a stop member likewise pivotally attached to said lug, pivoted for limited movement and having a portion adapted to engage said surface, and adjustable means for attaching said stop member to said extending handle member.

8. The structure of claim 6 in which said adjustable means comprises a member pivotally attached to said lug and releasably secured to said extending handle member for adjustment thereof and said stop member relative to said handle member.

References Cited in the file of this patent

UNITED STATES PATENTS

| | | |
|---|---|---|
| 583,134 | Wilks | May 25, 1897 |
| 854,424 | Ketterer | May 21, 1907 |
| 2,428,935 | Hansburg | Oct. 14, 1947 |
| 2,435,022 | Troendle | Jan. 27, 1948 |
| 2,593,962 | Barker | Apr. 22, 1952 |
| 2,600,611 | Bevington | June 17, 1952 |
| 2,617,670 | Welsh | Nov. 11, 1952 |
| 2,678,219 | Goodman | May 11, 1954 |